United States Patent
Shiina

(10) Patent No.: US 7,764,280 B2
(45) Date of Patent: Jul. 27, 2010

(54) CONTENT DISPLAY SYSTEM AND METHOD

(75) Inventor: Kazuya Shiina, Tokyo (JP)

(73) Assignees: Pioneer Corporation, Tokyo (JP); Pioneer Solutions Corporation, Tokyo (JP)

( * ) Notice: Subject to any disclaimer, the term of this patent is extended or adjusted under 35 U.S.C. 154(b) by 758 days.

(21) Appl. No.: 11/790,141

(22) Filed: Apr. 24, 2007

(65) Prior Publication Data

US 2007/0256102 A1    Nov. 1, 2007

(30) Foreign Application Priority Data

Apr. 26, 2006   (JP)   ............................. 2006-122445

(51) Int. Cl.
    *G06F 3/038*   (2006.01)
(52) U.S. Cl. .......................... 345/204; 345/619; 725/46
(58) Field of Classification Search ................ 345/204, 345/619; 705/50–53; 725/22, 45, 46
See application file for complete search history.

(56) References Cited

U.S. PATENT DOCUMENTS

| | | | |
|---|---|---|---|
| 6,912,652 B2 * | 6/2005 | Ito et al. ...................... 713/151 |
| 2004/0078338 A1 * | 4/2004 | Ohta et al. .................... 705/51 |
| 2004/0215568 A1 * | 10/2004 | Fukushima et al. ........... 705/51 |
| 2005/0228858 A1 * | 10/2005 | Mizutani et al. ............. 709/201 |
| 2005/0240530 A1 * | 10/2005 | Watanabe et al. .............. 705/52 |
| 2005/0251484 A1 * | 11/2005 | Hirayama et al. ............. 705/52 |
| 2006/0116965 A1 * | 6/2006 | Kudo et al. ................... 705/52 |
| 2006/0287956 A1 * | 12/2006 | Higashi et al. ................ 705/51 |
| 2007/0130068 A1 * | 6/2007 | Kitazato et al. ............... 705/50 |
| 2007/0299777 A1 * | 12/2007 | Shraim et al. ................. 705/51 |

FOREIGN PATENT DOCUMENTS

JP    2001-268600    9/2001

\* cited by examiner

*Primary Examiner*—Kimnhung Nguyen
(74) *Attorney, Agent, or Firm*—Nixon & Vanderhye P.C.

(57) ABSTRACT

In a content display system 100, a control unit 210 of a controller 200 performs a display control process. During the display control process, moreover, a reproduction monitoring process is performed, to thereby monitor whether or not content is displayed as scheduled. In the reproduction monitoring process, a pattern corresponding to the content is laid over the content in a display period corresponding to the display period of the content, and is used for the display performed by a display device 300. On the other hand, on a detection device 400, a pattern through the display performed by the display device 300 is detected. The detected pattern is compared with the pattern laid over the content by a comparison unit 240. The control unit 210 judges that the content is displayed as scheduled, if the both patterns match as a result of the comparison.

11 Claims, 10 Drawing Sheets

Schedule SCJ1

| 09:00:01 | 09:00:16 | 09:00:31 | 09:00:46 | 09:01:01 | 09:01:16 |
|---|---|---|---|---|---|
| Content 001 | Content 002 | Content 003 | Content 004 | Content 005 | |
| Pattern 0001 | Pattern 0010 | Pattern 0011 | Pattern 0100 | Pattern 0101 | |

Pattern 0101

Unit pattern PT4   Display area 320A   Unit pattern PT1

Unit pattern PT3   Unit pattern PT2

CONTENT DISPLAY SYSTEM AND METHOD

BACKGROUND OF THE INVENTION

1. Field of the Invention

The present invention relates to a content display system and method, which enable display of contents, such as, e.g., advertisements.

2. Description of the Related Art

As this type of apparatus, there is proposed an apparatus for monitoring whether the broadcast output of digital broadcasting is outputted as scheduled in broadcast programs (e.g. refer to Japanese Patent Application Laid Open NO. 2001-268600). According to the broadcast program schedule monitoring apparatus disclosed in Japanese Patent Application Laid Open NO. 2001-268600 (hereinafter referred to as a "conventional technology"), event information as for the schedule, and content identification information for identifying the content which constitutes the broadcast program are obtained from a broadcast program schedule server for managing the broadcast program schedule, and are sent to a comparing device. On the other hand, a packet including the event information and the content identification information is extracted from a transport stream, which is an output signal of a broadcasting apparatus, and is sent to the comparing device. Then, the comparing device compares whether or not they match, to thereby monitor whether the broadcast output is provided as instructed.

Whether or not the broadcast output of the digital broadcasting or the like is outputted as scheduled has no relationship with whether or not a terminal apparatus for displaying the broadcast output, such as, for example, a television apparatus, installed at home or the like accurately functions in its own installation location. Even if the broadcast output is outputted as scheduled, there is a possibility that the terminal apparatus cannot accurately display the broadcast output.

On the other hand, for example, in a case where the contents, such as advertisements, are distributed to the terminal apparatuses for display, installed in various locations, there is no meaning if the contents are not displayed on the terminal apparatuses in the end. Thus, it is necessary to actually monitor the displayed contents via the terminal apparatuses. In the conventional technology, however, it is only monitored whether the broadcast output is provided as instructed. Thus, it is hardly possible to avoid various problems, such as, for example, loss of business chances, appeal reduction, and reduction in cost-efficiency, which are likely caused if the terminal apparatuses do not accurately display the contents. Moreover, in order to deal with such problems, providing an observer and a monitoring device, such as a monitor camera, for example, as illustrated as the conventional technology in Japanese Patent Application Laid Open NO. 2001-268600, is remarkably disadvantageous in terms of cost and business investment, and it does not provide a practically beneficial effect. Namely, the conventional technology has such a technical problem that various benefits obtained by accurately displaying the contents are possibly lost.

SUMMARY OF THE INVENTION

It is therefore an object of the present invention to provide a content display system and method, which enable efficient and effective monitoring of whether the content or contents are displayed as scheduled.

<Content Display System>

The above object of the present invention can be achieved by a content display system provided with: a displaying device; a controlling device for controlling the displaying device to display, in accordance with a schedule in which at least content or contents to be displayed on the displaying device are specified with display period or periods of the content or contents to be displayed, the specified content or contents during the specified display period or periods, respectively; a pattern setting device for individually assigning video pattern or patterns in predetermined type or types to monitoring-target content or contents including at least one of the specified content or contents; a display period setting device for setting the display period or periods of the assigned video pattern or patterns in association with the display period or periods specified to the monitoring-target content or contents with the video pattern or patterns assigned, respectively; and a merging device for merging the assigned video pattern or patterns with the monitoring-target content or contents in at least one portion of the set display period or periods. The controlling device further controls the displaying device to display the monitoring-target content or contents with the video pattern or patterns merged, if the video pattern or patterns are merged with the monitoring-target content or contents. The content display system is further provided with: a detecting device for detecting the video pattern or patterns through display performed by the displaying device in such period or periods that the monitoring-target content or contents with the video pattern or patterns merged are displayed; and a judging device for judging whether or not the monitoring-target content or contents with the video pattern or patterns merged are displayed during the specified display period or periods on the basis of the detected video pattern or patterns.

The content display system of the present invention is provided with the displaying device, such as, e.g., a plasma display apparatus, a liquid crystal display apparatus, and a CRT (Cathode Ray Tube) display apparatus, installed in various installation locations, such as, e.g., in stations, event halls, movie theaters, hospitals, companies, auditoriums, downtowns, and play facilities. The content display system is also constructed to display the content or contents which can adopt various forms, such as, e.g., advertisements, news, promotion videos and various service menus. Incidentally, the "content or contents" in the present invention are not limited to the illustrated examples, and widely includes video information which can be displayed on the displaying device.

The content display system is provided with the controlling device which can adopt various forms, such as, e.g., a CPU (Central Processing Unit), a MPU (Micro Processing Unit), or various processors or processing units superior-controlled by the above-mentioned control unit, and the like. The controlling device controls the displaying device to display the content or contents in accordance with the schedule which is, for example, supplied in advance via a network, various recording media, or the like from the exterior, or which is generated on the basis of a man-made input operation or the like via some inputting device, or which is individually and specifically generated at each time on the basis of predetermined algorithm.

The "schedule" herein conceptually includes information in which at least the content or contents to be displayed on the displaying device are specified with the display period of the content or the display periods of the contents to be displayed. Incidentally, the "display period" carries a time point concept and indicates a finite period on an actual time axis defined by an absolute time point, such as, e.g., a display start time point and a display end time point, or by an elapsed time from a reference time point, or the like.

Incidentally, the aspect of specifying the content or contents in the schedule is not limited as long as the content or contents can be displayed on the displaying device in the end on the basis of the content specification. For example, the content data associated with the content display may be specified. Alternatively, for example, the location of the content data on a network may be specified.

On the other hand, according to the present invention, upon its operation, the video pattern or patterns in the predetermined type or types are individually assigned to the monitoring-target content or contents including at least one of the content or contents specified by the above mentioned schedule, by the operation of the pattern setting device which can adopt various forms, such as, e.g., a CPU, a MPU, or various processors or processing units superior-controlled by the above-mentioned control units, and the like.

Here, the "pattern or patterns in predetermined type or types" conceptually include a pattern associated with the judgment of whether or not each of the monitoring-target contents (if there is only one monitoring-target content, the one monitoring-target content) including at least one of the content or contents specified by the schedule is displayed during the respective one of the display periods specified by the schedule. Incidentally, the monitoring-target contents are preferably all the contents specified to be displayed by the schedule. However, for example, if there is some hierarchy among the contents specified by the schedule, one portion of the contents specified by the schedule may be set as the monitoring-target content or contents on the basis of the hierarchy. Alternatively, if monitoring quantity, monitoring frequency, monitoring rate or ratio, or the like can be determined or estimated to the extent that it can be judged that all the specified contents are displayed on the displaying device during the specified display periods, in advance, experimentally, experientially, or on the basis of simulation or the like, then the monitoring-target contents may be determined on the basis of the monitoring quantity, monitoring frequency, monitoring rate or ratio, or the like. Therefore, there may be a single monitoring-target content in some cases.

On the other hand, the display period or periods of the video pattern or patterns individually assigned to the monitoring-target content or contents are set in association with the display period or periods specified to the corresponding monitoring-target content or contents (i.e. the monitoring-target content or contents corresponding to the assigned video pattern or patterns in a one-to-one manner or in a one-to-many manner), by virtue of the above-mentioned schedule, by the display period setting device which can adopt various forms, such as, e.g., a CPU, a MPU, or various processors or processing units superior-controlled by the above-mentioned control units, and the like.

Here, the expression "in association with" conceptually includes being synchronized with at least one portion of the display period specified to each of the monitoring-target content or contents corresponding to the video pattern or patterns, or being set before and after the display period specified to each of the monitoring-target content or contents, or the like, and also includes such a state that the display period or periods of the video pattern or patterns are associated with the display period or periods of the corresponding monitoring-target content or contents in a one-to-one manner or in a many-to-one manner.

On the other hand, if the display period or periods of the video pattern or patterns are set in the above manner, the video pattern or patterns assigned to the monitoring-target content or contents are merged with the monitoring-target content or contents, in at least one portion of the set display period or periods, by the merging device which can adopt various forms, such as, e.g., a CPU, a MPU, or various processors or processing units superior-controlled by the above-mentioned control units, and the like.

Here the term "merge" includes to generate a video signal through a process of secondarily processing the monitoring-target content or contents in terms of software, and superimposing the video pattern or patterns on one portion of the content or contents, i.e. a so-called overlay process, or to generate a video signal so as to superimpose the video pattern or patterns and the monitoring-target content or contents on a display screen via an external hardware video merging device, and the like. The term "merge" conceptually includes to generate a video signal for display, which is visually recognized in such a condition that the video pattern or patterns and the monitoring-target content or contents are superimposed, with them displayed on the displaying device, by generating or processing video data or video signal, or by performing various image processing or video processing on the video data or video signal.

Incidentally, the expression "at least one portion of the set display period or periods" may be, of course, all the set display periods, but for example, if the merging is performed in each monitoring timing which comes regularly or irregularly during such display periods, the expression may be the timing which comes regularly or irregularly during such display period or periods.

Now, the above-mentioned controlling device controls the displaying device to display the monitoring-target content or contents with the video pattern or patterns merged, if the video pattern or patterns are merged with the monitoring-target content or contents. Therefore, in this case, on the displaying device, not only the content or content but also the merged video pattern or patterns are displayed, for example, inside the content or outside the content (which are watched by an audience) in the display area of the displaying apparatus, or outside the display area of the displaying device (i.e. an area which is not watched by an audience), in an area in which a time code and various setting information or the like are displayed, and the like.

In the present invention, if the monitoring-target content or contents with the video pattern or patterns merged are displayed in this manner, the video pattern or patterns through the display performed by the displaying device are detected during such period or periods that the monitoring-target content or contents with the video pattern or patterns merged are displayed, by the detecting device which can adopt aspects of various sensors or the like, fixed to the displaying device or located close to the displaying device. Moreover, it is judged whether or not the monitoring-target content or contents with the video pattern or patterns assigned are displayed during the display period or periods specified by the schedule, on the basis of the detected video pattern or patterns, by the judging device which can adopt various forms, such as, e.g., a CPU, a MPU, or various processors or processing units superior-controlled by the above-mentioned control units, and the like.

The display period or periods of the video pattern or patterns are set in association with the display period or periods of the corresponding monitoring-target content or contents, by the display period setting device, as described above. Whether the display period or periods of the video pattern or patterns are within the display period or periods of the monitoring-target content or contents or out of the display period or periods of the monitoring-target content or contents, they are at least synchronized with the display period or periods of the monitoring-target content or contents on the actual time axis. Therefore, which content is associated with which video pattern, and furthermore, which content is associated with the display period of which video pattern, are known in advance. Thus, on the basis of the video pattern or patterns detected in this manner, it is possible to easily judge whether or not the monitoring-target content or contents are displayed during the specified display period or periods.

At this time, the aspect of the judgment based on the detected video patterns is not limited as long as it can be judged whether or not the monitoring-target contents are displayed during the specified display periods. For example, if the video pattern detected by the detecting device via the displaying device during the display period of a certain video pattern matches the video pattern to be originally displayed during the display period, it may be judged that the monitoring-target content corresponding to the video pattern to be originally displayed is displayed on the displaying device. Incidentally, at this time, the judgment criteria of whether or not the both video patterns match each other may be set so as to cancel an error or the like, caused by the system and the detecting device, while an accuracy of the judgment is ensured, in advance experimentally, experientially, or on the basis of simulation or the like.

Moreover, the video patterns associated with the judgment may be arbitrary as long as they can be detected by the detecting device, and they may be relatively simple patterns obtained by coloring pixel areas or pixels themselves, which are small enough to be disregarded as compared to the display areas of the contents, in white or black, or obtained by combining the pixel areas or pixels. Therefore, the structure of the detecting device may be relatively simple, for example, as compared to a case where it is tried to detect the contents themselves. Moreover, considering that such video patterns are adopted, there is an extremely low possibility that the detection accuracy is influenced by characteristics unique to the displaying device, such as, e.g., resolution and an aspect ratio, As described above, according to the present invention, whether or not the content or contents are displayed as scheduled can be efficiently judged on the basis of the detection result of the video pattern or patterns displayed in synchronization with the content or contents. Moreover, at this time, the video pattern or patterns can be constructed relatively simply, so that the judgment accuracy does not depend on the type and features of the displaying device, and it is effective. Namely, according to the present invention, it can be efficiently and effectively monitored whether or not the content or contents are displayed as scheduled.

In one aspect of the content display system of the present invention, in the schedule, the video pattern or patterns to be assigned to the monitoring-target content or contents are further specified with the display period or periods of the video pattern or patterns to be assigned, the pattern setting device assigns the specified video pattern or patterns to the monitoring-target content or contents in accordance with the schedule, and the display period setting device sets the display period or periods of the assigned video pattern or patterns as the display period or periods specified in accordance with the schedule.

According to this aspect, the video pattern or patterns to be assigned to the monitoring-target content or contents are specified with the display period or periods thereof in advance by the schedule, which reduces the loads of the pattern setting device and the display period setting device.

In another aspect of the content display system of the present invention, it is further provided with a first memory device for storing each of content data associated with the display of the content or contents and video pattern data associated with the display of the video pattern or patterns.

According to this aspect, each of the content data associated with the display of the content or contents and the video pattern data associated with the display of the video pattern or patterns is stored in advance in the first memory device which can be provided with various recording media, such as, for example, a HD (Hard Disk), a CD (Compact Disc), a DVD, and a BD (Blu-ray Disc), or which can adopt a form of a rewritable memory element or the like, such as a RAM (Random Access Memory) and a flush memory. Thus, aside from the display of the content or contents, the data can be obtained in advance in desired timing. Therefore, practically, an extremely useful effect can be achieved.

Incidentally, in this aspect, it may be further provided with a first obtaining device for obtaining the content data and the video pattern data from a predetermined server apparatus via a network.

In this case, the data is obtained, as occasion demands, by the first obtaining device from the server apparatus placed in the network, via the network, wherein the first obtaining device can adopt various forms, such as, e.g., a CPU, a MPU, or various processors or processing units superior-controlled by the above-mentioned control units, and the like, and the server apparatus can adopt the structure of various computer systems, such as a personal computer and a work station, and the network can adopt various forms, such as a broadband communication network, like the Internet or the like, connected through a communication network, such as, e.g. a LAN (Local Area Network) and a WAN (Wide Area Network), or a communication network, such as a phone line passed through or without through the LAN and WAN, ADSL (Asymmetry Digital Subscriber Line), and optical cable. Therefore, the content data and the video pattern data can be relatively easily obtained, so that it is effective. Moreover, considering that the data can be obtained via the network as described above, the data can be obtained in advance in a time zone during which there is enough margin in the system load. It is preferable because that increases the degree of freedom.

In another aspect of the content display system of the present invention, it is further provided with: a second obtaining device for obtaining schedule data for defining the schedule from a predetermined server apparatus via a network; and a schedule setting device for setting the schedule on the basis of the obtained schedule data.

According to this aspect, the schedule data for defining the above-mentioned various schedules is obtained by the second obtaining device from the predetermined server apparatus or the like placed in the network, via the network, wherein the schedule data is constructed in descriptive language, such as, e.g. XML (extensible Markup Language), and the second obtaining device can adopt various forms, such as, e.g., a CPU, a MPU, or various processors or processing units superior-controlled by the above-mentioned control units, and the like, and the predetermined server apparatus can adopt the structure of various computer systems, such as a personal computer and a work station, and the network can adopt various forms, such as a broadband communication network, like the Internet or the like, connected through a communication network, such as, e.g. a LAN and a WAN, or a communication network, such as a phone line passed through or without through the LAN and WAN, ADSL, and optical cable.

The schedule data is analyzed by the schedule setting device and is used as the above-mentioned various schedules in the operation of each of the above-mentioned devices, wherein the schedule setting device can adopt various forms, such as, e.g., a CPU, a MPU, or various processors or processing units superior-controlled by the above-mentioned control units, and the like.

Here, if the schedule about the display of the content or contents is given in advance via the network as the schedule data, a content distribution system, such as, e.g., remote cast BB (registered trademark), is preferably realized.

For example, in this case, if a desired schedule is sent in advance to a company, operator, or the like which owns the server apparatus for supplying the schedule data, the scheduled data that reflects the desired schedule can be supplied via the network, so that the content distribution system can be constructed relatively easily. Alternatively, even if there is not particularly any desired schedule, the schedule data about a schedule which is recommended or set in default in advance can be obtained via the network, so that the same effect can be expected.

Moreover, if the above-mentioned content data and pattern data, or at least data which expresses the presence of the content data and the pattern data (e.g. URL, etc.) or the like are supplied from the server apparatus for supplying the schedule data, and moreover, if the schedule data includes data for specifying the above-mentioned video pattern or patterns and their display period or periods, the loads of setting and displaying the content or contents and the video pattern or patterns can be remarkably reduced. At the same time, the video pattern or patterns suitable for the content or contents and the display period or periods suitable for the content or contents can be set in advance on the server apparatus side. Thus, it is efficient and effective.

Incidentally, in this aspect, it may be further provided with a second memory device for storing the obtained schedule data.

In this case, the schedule data can be stored in the second memory device which can be provided with various recording media, such as, for example, a HD, a CD, a DVD, and a BD, or which can adopt a form of a rewritable memory element or the like, such as a RAM and a flush memory. Thus, the schedule data can be obtained in desired timing, which is preferable. Incidentally, the second memory device may have at least partially the same hardware configuration as that of the above-mentioned first memory device, or may have a totally independent hardware configuration.

In another aspect of the content display system of the present invention, the judging device judges, if the detected video pattern or patterns match the video pattern or patterns assigned to the monitoring-target content or contents corresponding to time point or points in which the video pattern or patterns are detected, that the corresponding monitoring-target content or contents are displayed during the display period or periods.

According to this aspect, if the detected video patterns match the video patterns assigned to the monitor-target contents corresponding to the time point or point in which the video patterns are detected, it is judged that the corresponding monitoring-target contents are displayed during the display periods. Thus, it is possible to accurately and simply judge whether or not the relevant monitoring-target contents are displayed as scheduled.

Incidentally, the term "match" includes the state that they are completely identical to each other, and conceptually further includes the state that they match each other to the extent that it can be regarded as being consistent with each other. The judgment criteria of whether or not the both video patterns match each other may be set so as to cancel an error or the like, caused by the system and the detecting device, while an accuracy of the judgment is ensured, in advance experimentally, experientially, or on the basis of simulation or the like.

In another aspect of the content display system of the present invention, each of the video pattern or patterns comprises at least one of unit patterns, which have geometric shapes with mutually different brightness, and at least one of which is set in a plurality of pattern set positions set in advance, and degree of brightness in each of the plurality of pattern set positions is detected during the period or periods that the monitoring-target content or contents with the video pattern or patterns merged are displayed.

According to this aspect, each of the video pattern or patterns includes at least one of the plurality of types of unit patterns, which have geometric shapes with mutually different brightness. At least one of the plurality of types of unit patterns with mutually different brightness is set in each of the plurality of pattern set positions set in advance. More specifically, each video pattern may be a discrete pattern formed by two types of unit patterns, which are located, for example, on the four corners of the display area of the displaying device such that the diagonally located unit patters have the same brightness. In this case, for example, on the basis of the judgment of whether one unit pattern is brighter or darker than reference brightness, one bit information can be given. Therefore, 4 bits in total, i.e., 16 types of identification information can be generated. Namely, in simple logic, if the mutually different video pattern or patterns are given to the respective monitoring-target content or contents, 16 types of monitoring-target contents can be set. In another perspective, by increasing the number of the unit patters, the detection accuracy of the video patterns can be easily improved.

On the other hand, looking from the detecting device side, with regard to the structure of the detecting device, for example, the degree of brightness in video images through the displaying device in the pattern set position may be binarily detected, at least in whether to be darker or brighter than the reference. Moreover, for example, various known brightness sensors or the like can be used. Therefore, according to this aspect, the load on the operation of the content display system is practically light, so that it can be efficiently and effectively monitored whether or not the content or contents are displayed as scheduled.

Incidentally, considering that it is only necessary to detect the degree of brightness, the shape of the unit pattern may be relatively simple, such as rectangular and round. Moreover, its size is not limited as long as the degree of brightness can be accurately detected. For example, it may be determined depending on the detection accuracy of the detecting device, or it may be determined without interfering with the content display and to the extent that the detection accuracy is not reduced, in advance, experimentally, experientially, or on the basis of simulation or the like.

In the same manner, the positions of the unit patterns in the video pattern (i.e. the pattern set positions) are not limited to the four corners of the display area described above. For example, if the content extends to the outside of the display area of the displaying device, which is not watched by an audience, the pattern set position may be set in a predetermined position outside the display area. In this case, the installation location of the detecting device may be set, for example, inside the displaying device, to thereby substantially unify the detecting device and the displaying device. Namely, the display position of the video pattern in the present invention is not necessarily limited to a position which is watched by an audience.

Incidentally, the display colors of the unit patterns are not limited as long as there is a significant difference in their brightness. However, if the unit patterns are constructed in white and black, there is a clear difference in the brightness between the two, so that it is preferable.

In another aspect of the content display system of the present invention, it is further provided with: a result information generating device for generating result information indicating a judgment result associated with the judging device; and a third memory device for storing the generated result information.

According to this aspect, the result information, such as, e.g., a log, indicating the judgment result associated with the judging device is generated by the result information generating device, and is stored by the third memory device, wherein the result information generating device can adopt various forms, such as, e.g., a CPU, a MPU, or various processors or processing units superior-controlled by the above-mentioned control units, and the like, and the third memory device can be provided with various recording media, such as, for example, a HD, a CD, a DVD, and a BD, or can adopt a form of a rewritable memory element or the like, such as a RAM and a flush memory.

Therefore, for example, information as for whether the content or contents are displayed as scheduled on the displaying device on a certain specified date or for a past certain period, or the like can be obtained and referred to in arbitrary timing from the exterior. Alternatively, whether the currently displayed content is displayed as scheduled can be referred to in real time from the exterior. Therefore, it is possible to easily take appropriate measures against the displaying device and each of the devices which constitute the content display system, in accordance with the result information. Even from a long-term standpoint, the reliability of the content display system can be improved.

In another aspect of the content display system of the present invention, the merging device lays the assigned video pattern or patterns over the monitoring-target content or contents.

According to this aspect, the merging device lays the video pattern or patterns over the monitoring-target content or contents, to thereby merge them. Thus, it is possible to easily synchronize the display period or periods of the video pattern or patterns and the display period or periods of the monitoring-target content or contents. Moreover, in this case, by selecting the presence or absence of the overlay, for example, if there is no need to monitor the content display, the content or contents can be easily displayed in the original condition. Thus, the convenience is ensured.

<Content Display Method>

The above object of the present invention can be also achieved by a content display method provided with: a first controlling process of controlling a displaying device to display, in accordance with a schedule in which at least content or contents to be displayed on the displaying device are specified with display period or periods of the content or contents to be displayed, the specified content or contents during the specified display period or periods, respectively; a pattern setting process of individually assigning pattern or patterns in predetermined type or types to monitoring-target content or contents including at least one of the specified content or contents; a display period setting process of setting the display period or periods of the assigned video pattern or patterns in association with the display period specified to the monitoring-target content or contents with the video pattern or patterns assigned, respectively; a merging process of merging the assigned video pattern or patterns with the monitoring-target content or contents in at least one portion of the set display period or periods; a second controlling process of controlling the displaying device to display the monitoring-target content or contents with the video pattern or patterns merged, if the video pattern or patterns are merged with the monitoring-target content or contents; a detecting process of detecting the video pattern or patterns through display performed by the displaying device in such period or periods that the monitoring-target content or contents with the video pattern or patterns merged are displayed; and a judging process of judging whether or not the monitoring-target content or contents with the video pattern or patterns merged are displayed during the specified display period or periods on the basis of the detected video pattern or patterns.

According to the content display method of the present invention, by virtue of the operation in each process equivalent with respective one of the devices in the content display system of the present invention, it can be efficiently and effectively monitored whether or not the content or contents are displayed as scheduled, as in the content display system of the present invention.

As explained above, the content display system of the present invention is provided with the displaying device, the controlling device, the pattern setting device, the display period setting device, the merging device, the detecting device, and the judging device, so that it can be efficiently and effectively monitored whether or not the content or contents are displayed as scheduled.

As explained above, the content display method of the present invention is provided with the first controlling process, the pattern setting process, the display period setting process, the merging process, the second controlling process, the detecting process, and the judging process, so that it can be efficiently and effectively monitored whether or not the content or contents are displayed as scheduled.

The nature, utility, and further features of this invention will be more clearly apparent from the following detailed description with reference to preferred embodiment of the invention when read in conjunction with the accompanying drawings briefly described below.

DETAILED DESCRIPTION OF THE PREFERRED EMBODIMENTS

Hereinafter, the embodiments of the present invention will be discussed with reference to the drawings.

First Embodiment

Figure 1:
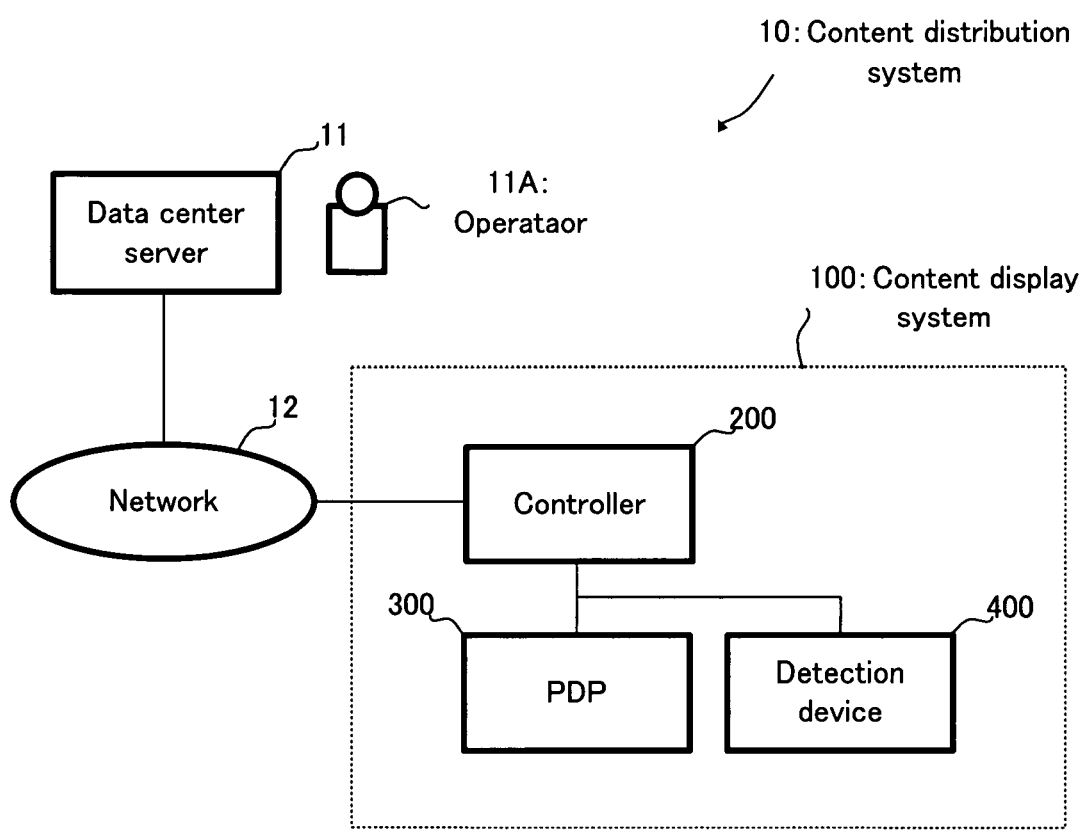
FIG. 1 is a schematic diagram showing a content distribution system in a first embodiment of the present invention.

Firstly, with reference to FIG. 1, the structure of a content distribution system in a first embodiment of the present invention will be explained. FIG. 1 is a schematic diagram showing a content distribution system 10.

In FIG. 1, the content distribution system 10 is provided with: a data center server 11; and a content display system 100, which are placed in a network 12 as a wide area network, such as, e.g. the Internet. The content distribution system 10 is operated by an operator 11A and is constructed to provide various video contents, such as advertisements, for the general public audiences via the content display system 100 installed in locations, such as in stations, event halls, movie theaters, hospitals, companies, auditoriums, downtowns, and play facilities.

The data center server 11 is a server apparatus owned by the operator 11A and is one example of the "server apparatus" of the present invention. The data center server 11 is constructed to store therein content data, pattern data, schedule data and the like described later, which are associated with contents to be displayed in the content display system 100, and to supply the various data to the content display system 100 via the network 12, as occasion demands.

The content display system 100 is one example of the "content display system" of the present invention, provided with: a controller 200; a PDP (Plasma Display Panel) 300; and a detection device 400.

The controller 200 is a computer system, such as a personal computer or the like. The controller 200 is constructed to perform a display control process described later, which is one example of the "content display method" of the present invention, in accordance with an application program. Incidentally, the detailed structure of the controller 200 will be described later.

The PDP 300 is a plasma display apparatus having a display area relatively large enough to provide contents for the general public audiences, and is one example of the "displaying device" of the present invention. Incidentally, the detailed structure of the PDP 300 will be described later.

The detection device 400 is one example of the "detecting device" of the present invention, including a plurality of brightness sensors built in the PDP 300. The sensors included in the detection device 400 are identical to each other, and each sensor is constructed to output any of two-value voltages, which are high and low, depending on the brightness of a detection target position. The sensors use, for example, CdS (cadmium sulfide). The detection device 400 is electrically connected with the controller 200. The controller 200 is constructed to obtain a signal corresponding to the voltage outputted by each sensor, as a detection result of the detection device 400.

Figure 2:
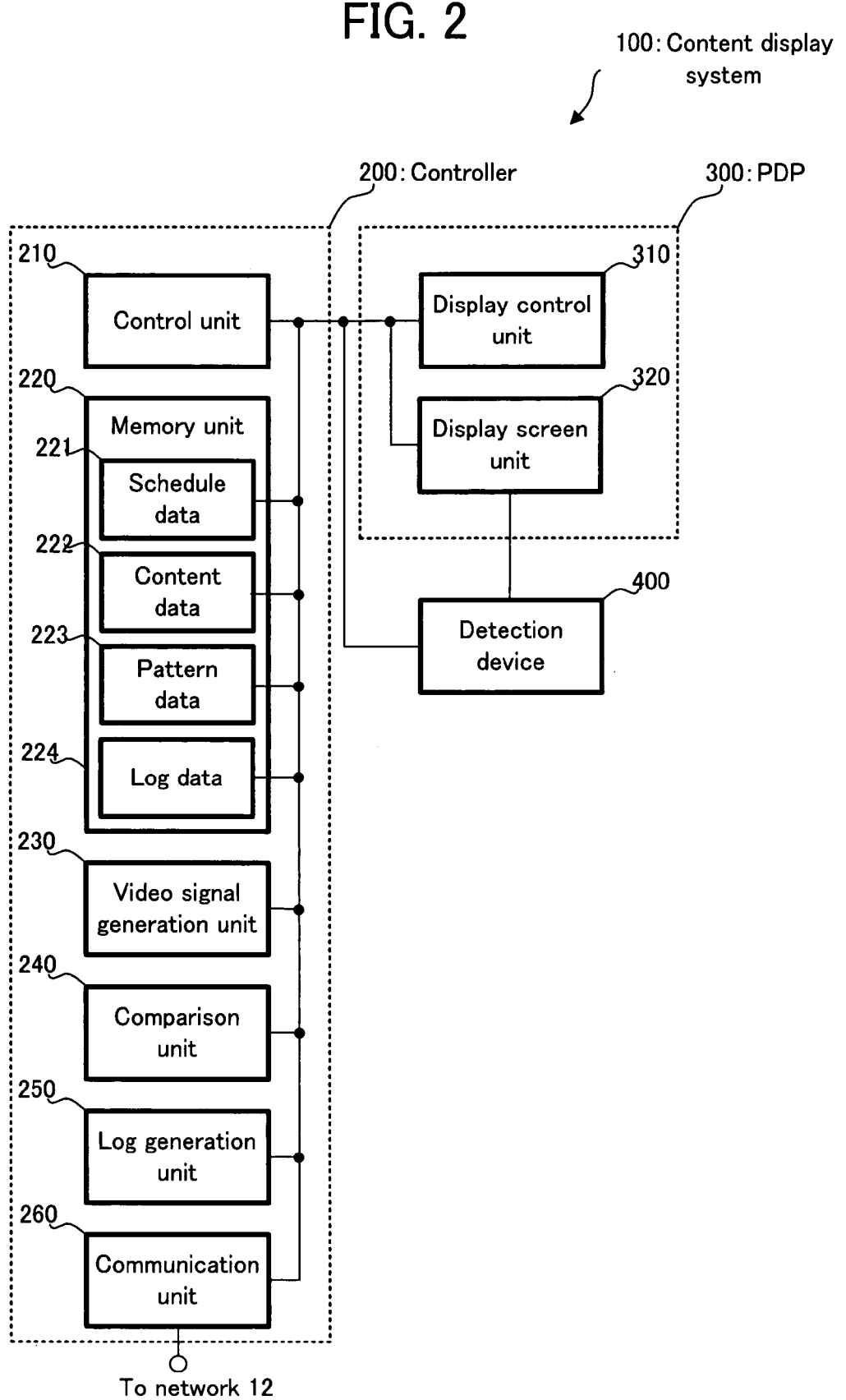
FIG. 2 is a block diagram showing a content display system which constitutes the content distribution system in FIG. 1.

Next, with reference to FIG. 2, the detailed structure of the content display system 100 will be explained. FIG. 2 is a block diagram showing the content display system 100. Incidentally, in FIG. 2, the same positions as those in FIG. 1 carry the same numerical references, and the explanation thereof will be omitted, as occasion demands.

In FIG. 2, the controller 200 is provided with: a control device 210; a memory unit 220; a video signal generation unit 230; a comparison unit 240; a log generation unit 250; and a communication unit 260.

The control unit 210 is, for example, an arithmetic processing unit provided with a CPU or the like, and is constructed to perform a display control process. The control unit 210 is also constructed to function as one example of each of the "controlling device," the "pattern setting device", the "display period setting device", the "schedule setting device", and the "judging device" of the present invention, in the display control process.

The memory unit 220 is a relatively large-capacity memory unit, such as a HDD or the like, and is one example of the "first memory device", the "second memory device", and the "third memory device" of the present invention. The memory unit 220 is constructed to store therein, for example, schedule data 221, content data 222, and pattern data 223, which are obtained from the data center server 11 described above, and log data 224 described later, or the like.

The schedule data 221 is data for defining a display schedule (i.e. one example of the "schedule" of the present invention) of contents in the content display system 100. Particularly in the embodiment, the scheduled data 221 adopts a structure of XML data described in XML (eXtensible Markup Language).

The content data 222 is video data related to contents to be displayed, and based on the motion picture compression standard, such as MPEG or the like.

The pattern data 223 is data for display, associated with a pattern to be merged with content displayed on the PDP 300.

The log data 224 is data about various logs (one example of the "result information" of the present invention) generated by the log generation unit 250, during the display control process.

The video signal generation unit 230 is a video processing unit, superior-controlled by the control unit 210 and is constructed to function as one example of the "merging device" of the present invention. The video signal generation unit 230 is constructed to generate a video signal to be supplied to the PDP 300 through various processes, such as decoding or the like, on the basis of the above-mentioned content data 222 and pattern data 223 or the like stored in the memory unit 220.

The comparison unit 240 is a processing unit superior-controller by the control unit 210 and is constructed to perform the comparison associated with the detected pattern in a reproduction monitoring process described later, which is performed, as occasion demands, during the display control process.

The log generation unit 250 is a processing unit superior-controlled by the control unit 210 and is constructed to generate various logs, as occasion demands, during the display control process. The log generation unit 250 is one example of the "result information generating device" of the present invention.

The communication unit 260 is a communication processing unit superior-controlled by the control unit 210 and is constructed to obtain the schedule data 221, the content data 222, and the pattern data 223 from the data center server 11 via the network 12. The communication unit 260 is one example of the "first obtaining device" and the "second obtaining device" of the present invention.

The PDP 300 is provided with: a display controller unit 310; and a display screen unit 320.

The display control unit 310 is a controller unit for displaying video images, superior-controlled by the control unit 210 of the controller 200. The display control unit 310 is constructed to display the contents and the overlay contents described later on the display screen unit 320, on the basis of the video signal supplied from the video signal generation unit 230 described above, under the control of the control unit 210.

The display screen unit 320 is a display panel unit for displaying various video images (including the contents) on the PDP 300. An area of the display screen unit 320 which can be visually recognized by audiences is a display area 320A (not illustrated in FIG. 2) described later.

Operation of Embodiment

Figure 3:
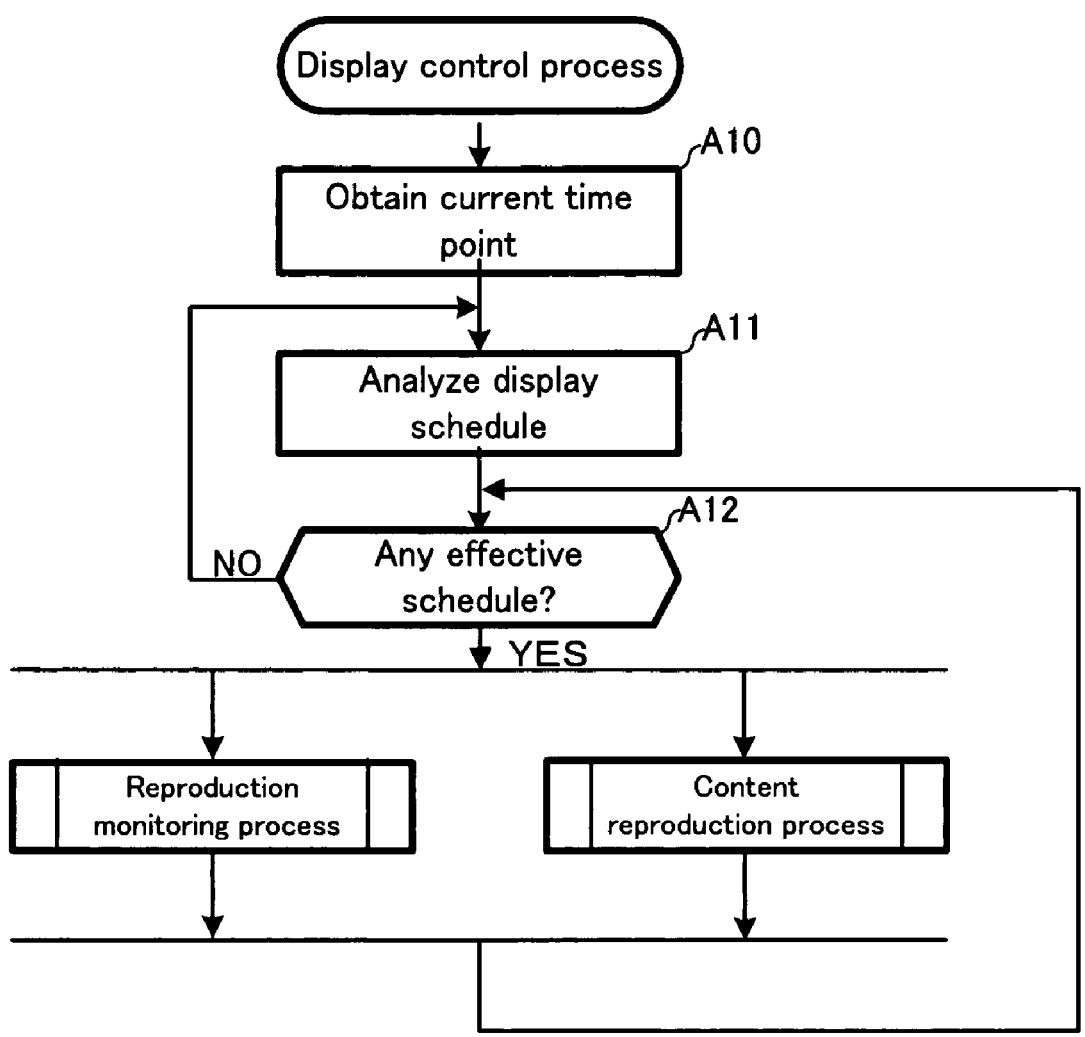
FIG. 3 is a flowchart showing a display control process performed in the content display system in FIG. 2.

In view of the characteristics of the content display system 100, whether the content distribution system 10 is charged or not, content needs to be displayed on the PDP 300 as scheduled. Thus, the control unit 210 of the controller 200 is constructed to monitor whether the content is displayed as scheduled, as occasion demands, during the display control process. Here, as the operation of the embodiment, the details of the display control process will be explained. FIG. 3 is a flowchart showing the display control process. Incidentally, it is assumed that the display control process is a process performed at the start of the controller 200.

In FIG. 3, the controller 210 obtains a current time point (step A10). At this time, the controller 210 controls the communication unit 260, to thereby access the data center server 11 and synchronize the data center server 11 and the time point information.

Then, the control unit 210 analyzes the schedule data 221 (step A11), and also judges whether or not there is an effective (i.e., valid) schedule (step A12). If there is no effective schedule (the step A12: No), the control unit 210 returns the process to the step A12 and continues the analysis of the schedule synchronized with the current time point. At the same time, the control unit 210 repeats the judgment of the step A12. If there is an effective schedule (the step A12: Yes), the control unit 210 performs a content reproduction process associated with content reproduction and a reproduction monitoring process associated with the monitoring of the reproduced content, in parallel with each other.

Figure 4:
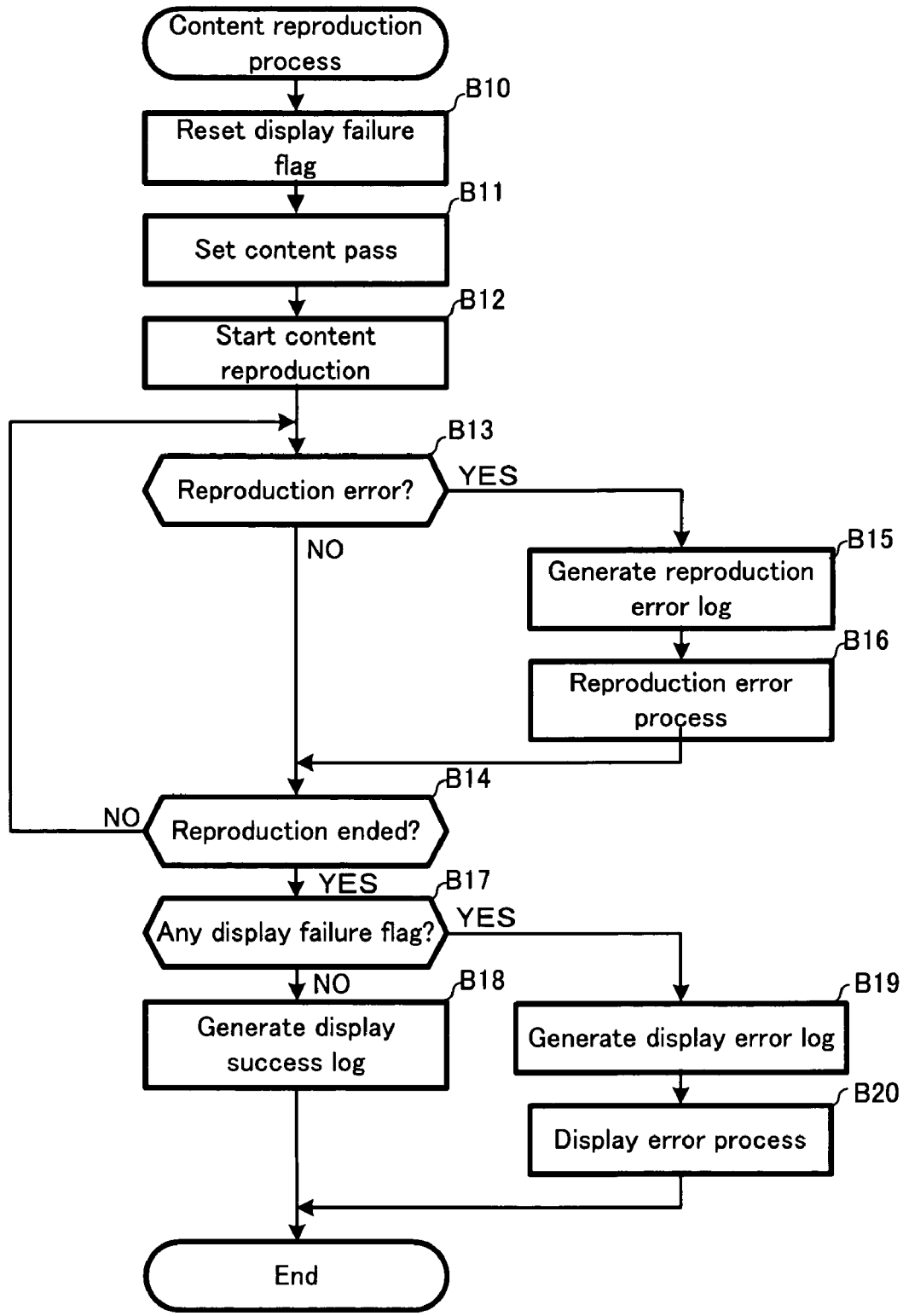
FIG. 4 is a flowchart showing a content reproduction process performed in the display control process in FIG. 3.

Now, with reference to FIG. 4, the details of the content reproduction process will be explained. FIG. 4 is a flowchart showing the content reproduction process.

In FIG. 4, the control unit 210 resets a display failure flag (step B10). The display failure flag is set on the buffer memory of the control unit 210 if it is judged that the content is not displayed as scheduled, in the reproduction monitoring process described later. The display failure flag is reset to its default in the beginning of the content reproduction.

Then, the control unit 210 sets a content pass for specifying the content to be reproduced, with respect to the video signal generation device 230, in accordance with the analyzed schedule (step B11).

If the content pass is set, the control unit 210 controls the video signal generation device 230 to thereby start the reproduction of the contents to be reproduced (step B12).

If the reproduction of the content is started, the control unit 210 judges whether or not a reproduction error occurs (step B13). The reproduction error herein is an error related to the reproduction process, such as a decode error or the like, and is mainly grasped or controlled by the control unit 210 via the video signal generation unit 230. If the reproduction error occurs (the step B13: YES), the control unit 210 controls the log generation unit 250, to thereby generate a reproduction error log which describes the content of the reproduction error and its occurrence time point (step B15), and performs an appropriate reproduction error process, such as, e.g., skipping a failure position and repeating the reproduction (step B16), and moves the process to a step B14.

If the reproduction error does not occur (the step B13: NO), or if the process in the step S16 is performed, the control unit 210 judges whether or not it is a reproduction end timing (step B14). The reproduction end timing herein is defined as an end time point by the schedule described in XML.

If it is not the reproduction end timing (the step B14: NO), the control unit 210 returns the process to the step S13, and repeats the series of processes. At the same time, if the reproduction end timing of the content comes (the step B14: YES), the control unit 210 judges whether or not the display failure flag is set (step B17).

If the display failure flag is set (the step B17: YES), the control unit 210 controls the log generation unit 250, to thereby generate a display error log which describes the detailed content of a display error and its occurrence time point and the like (step B19), performs a display error process including an appropriate recovery process (step B20), and ends the content reproduction process. The generated log is stored into the memory unit 220 as one portion of the log data 224.

On the other hand, if the display failure flag is not set (the step B17: NO), the control unit 210 takes the fact as a success in the content reproduction, and controls the log generation unit 250, to thereby generate a display success log which indicates that the content reproduction is ended as scheduled (step B18), and ends the content reproduction process. Incidentally, the generated display success log is stored into the memory unit 220 as in the display error log.

Figure 5:
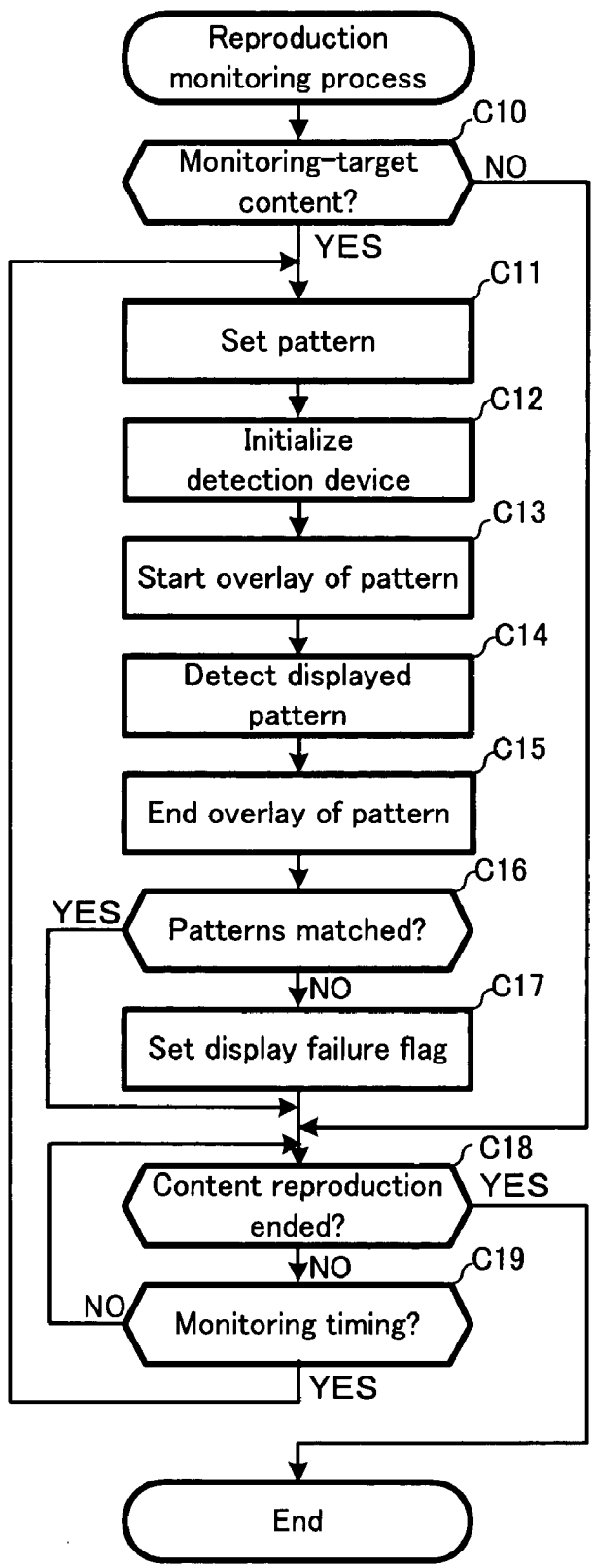
FIG. 5 is a flowchart showing a reproduction monitoring process performed in the display control process in FIG. 3.

Next, with reference to FIG. 5, the details of the reproduction monitoring process will be explained. FIG. 5 is a flowchart showing the reproduction monitoring process.

In FIG. 5, the control unit 210 judges whether or not the content whose reproduction is instructed by the schedule is the monitoring-target content (step C10). The monitoring-target content herein is set to monitor whether or not to be displayed as scheduled, and generally corresponds to all the contents instructed by the schedule fall under the category.

If the content to be reproduced (or the content reproduced by the above-mentioned content reproduction process) is the monitoring-target content (the step C10: YES), the control unit 210 sets a pattern assigned to the content by the schedule (step C11).

Figures 6, 7:
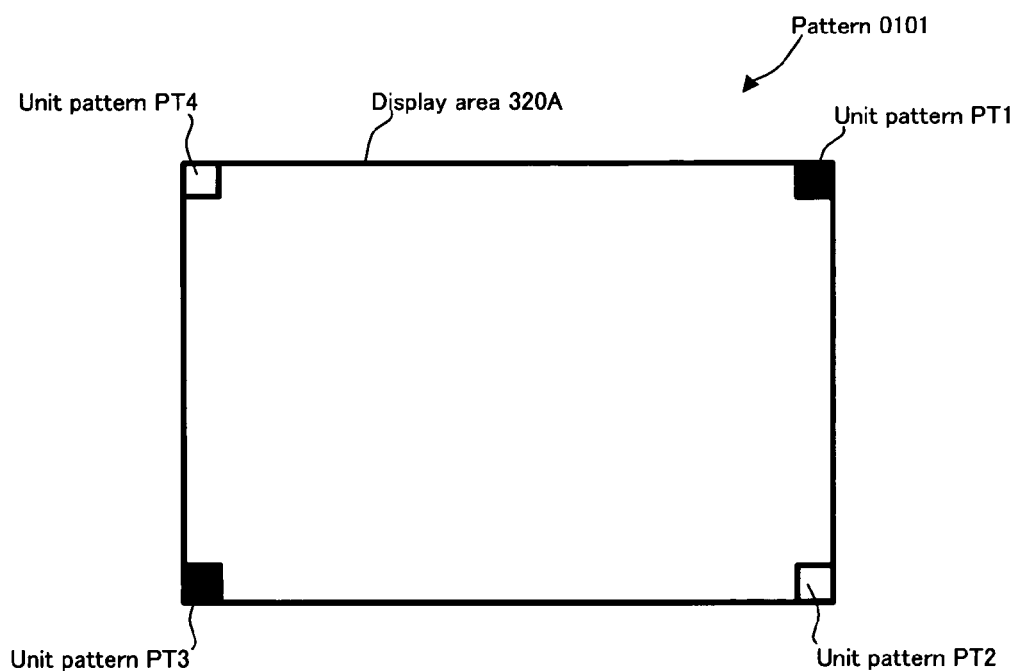
FIG. 6 is a schematic diagram showing a schedule associated with the content reproduction.
FIG. 7 is a schematic diagram showing a pattern laid over content.

Now, with reference to FIG. 6, the details of the schedule will be explained. FIG. 6 is a schematic diagram showing a schedule SCJ1 which represents one portion of the schedule analyzed in the content reproduction process.

In FIG. 6, in the schedule SCJ1, the content to be reproduced and the pattern assigned to the content to be reproduced are specified with their own display periods. Particularly, in the schedule SCJ1, all the contents to be reproduced are the monitor-target contents, and different patterns are assigned to them respectively.

For example, according to the schedule SCJ1, it specifies that the reproduction of content 001 is started at, e.g., a time point of 1 second past 9 o'clock (corresponding to "09:00:01" illustrated) and the reproduction of content 002 is started after 15 seconds of the reproduction of the content 001. It also specifies that a pattern 0001 is to be merged with the content 001 for 15 seconds which is the display period of the content 001, or the like.

Now, furthermore, with reference to FIG. 7, the details of the pattern will be explained. FIG. 7 is a schematic diagram showing a pattern 0101 (i.e. a pattern specified such that it is to be merged with content 5 in FIG. 6).

In FIG. 7, the pattern 0101 is provided with unit patterns PT1, PT2, PT3, and PT4 (i.e. one example of the "unit patterns" of the present invention) located on the four corners of the above-mentioned display area 320A on the display screen unit 320 of the PDP 300. The individual unit pattern is a white or black rectangular pattern and is used for the detection of the brightness by the detection device 400, wherein the white color corresponds to a state of "bright" and the black color corresponds to a state of "dark".

Here, "0101", which is a sign or code for identifying each pattern, expresses the output electric potentials of the unit patterns PT1, PT2, PT3, and PT4 in order from the left side, wherein the output electric potential of the detection device 400 in white, i.e. in the "bright" state, is "1", and the output electric potential of the detection device 400 in black, i.e. in the "dark" state, is "0". The pattern 0101 represents a pattern indicating that the unit patterns PT1 and PT3 are black and the unit patterns PT2 and PT4 are white. The size of the individual unit pattern can be set, with respect to the display area 320A, small enough not to interfere with the content display as long as the brightness and darkness can be identified by the detection device 400.

Back in FIG. 5, in the process in the step C11, the control unit 210 selects pattern data corresponding to the pattern assigned to the reproduction-target content by the schedule SCJ1 (e.g. the pattern 0001 if the content 001 is reproduced) out of the pattern data 223, and supplies it to the video signal generation unit 230. If the process in the step C11 ends, the control unit 210 initializes the detection device 400 (step C12).

If the initialization of the detection device 400 ends, the control unit 210 controls the video signal generation unit 230, to thereby start the overlay of the set pattern (step C13). The process in the step C13 is performed cooperatively with the process in the step B12 in the above-mentioned content reproduction process. The video signal generation unit 230 generates a video signal about the overlay content, obtained by laying the relevant pattern over the content to be reproduced, and supplies it to the display control unit 310 of the PDP 300.

Now, with reference to FIG. 8, the overlay of the pattern will be explained. FIG. 8 are conceptual views of the overlay of the pattern. Incidentally, in FIG. 8, the same or repeated positions as those in FIG. 7 carry the same numerical references, and the explanation thereof will be omitted, as occasion demands.

Figure 8A:
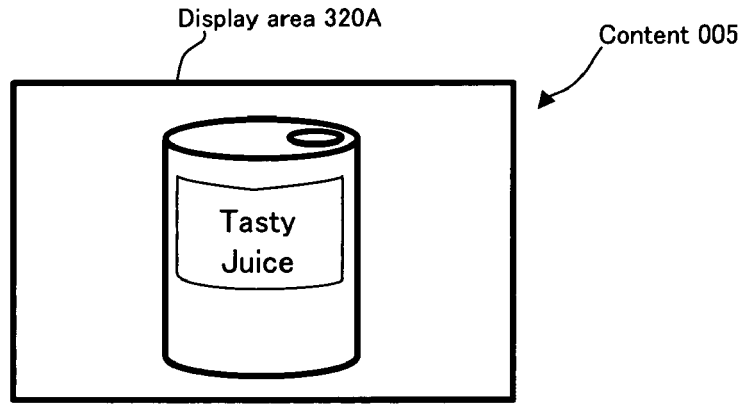
FIG. 8 are conceptual views of the overlay of the pattern.
Figure 8B:
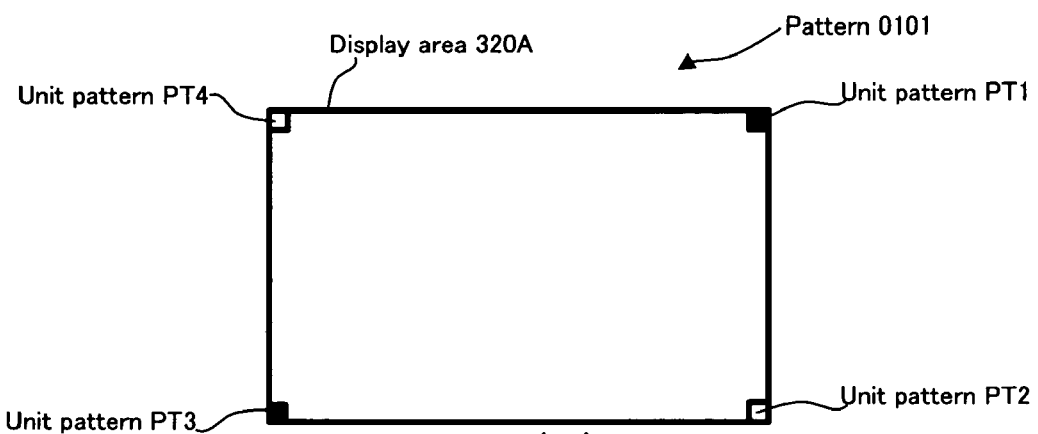
Figure 8C:
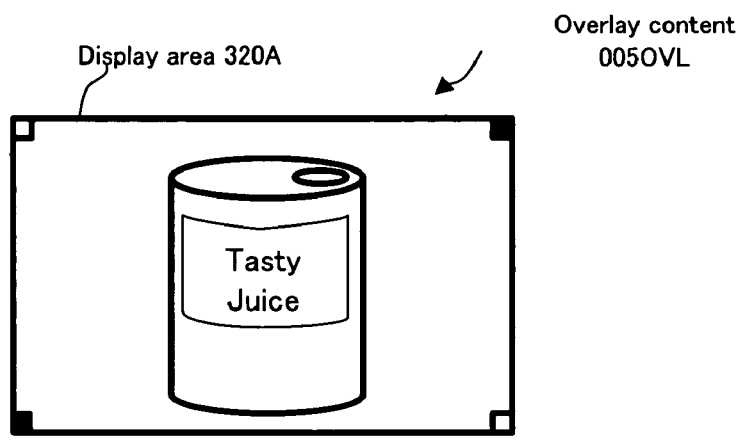

In FIG. 8, content 005 is a video image about the advertisement of beverage, expanded in the entire display area 320A (refer to FIG. 8(a)). Here, a pattern to be laid over the content 005 is the pattern 0101 (refer to FIG. 8(b)). In the process in the step C13 in FIG. 5, the pattern is overlaid, and overlay content 005OVL displayed on the PDP 300 is as shown in FIG. 8(c). As shown in FIG. 8(c), the overlaid (i.e. merged) pattern is set to have such a size that does not influence the content.

Back in FIG. 5, if the overlay of the pattern is started, the control unit 210 controls the detection device 400 and detects the brightness of the unit patterns of the overlay content (e.g. the overlay content 005OVL) to thereby detect the pattern (step C14). If it is announced from the detection device 400 that the pattern detection ends (e.g. if the output electric potentials of the individual sensors are determined), the control unit 210 ends the overlay of the pattern (step C15).

If the overlay of the pattern ends, the control unit 210 controls the comparison unit 240, to thereby compare the detected pattern with the pattern corresponding to the currently reproduced content, and judges whether or not the both patterns match each other, on the basis of the comparison result (step C16). For example, if the detected pattern is "0101" in the overlay content 005OVL, in a case where the output electric potential of each sensor is expressed in accordance with the already-mentioned arrangement aspect, it is judged that the both patterns match each other.

Here, the expression that "the both patterns match each other" means that the overlaid pattern synchronized with the reproduction period (or display period) of the content is accurately displayed via the display screen unit 320 of the PDP 300, and also means that the content with the pattern overlaid is also displayed as scheduled. Namely, in the embodiment, by virtue of such comparison of the patterns, it is preferably monitored whether or not the content is displayed as scheduled.

If the patterns do not match (the step C16: NO), the control unit 210 sets the above-mentioned display failure flag (step C17), and moves the process to a step C18. On the other hand, if the patterns match each other (the step C16: YES), the control unit 210 moves the process to the step C18.

In a process in the step C18, it is judged whether or not the content reproduction is ended. Whether or not the content reproduction is ended can be easily judged during the content reproduction process performed in parallel.

If the content reproduction is still in process (the step C18: NO), the control unit 210 judges whether or not it is the content monitoring timing (step C19). Here, the control unit 210 is constructed to repeat the overlay of the pattern at a constant interval in the pattern display period (i.e. corresponding to the content display period in the embodiment) e.g., if a predetermined interval elapses after the overlay of the pattern. In the process in the step C19, it is judged whether the interval elapses.

If it is not the monitoring timing (the step C19: NO), the control unit 210 moves the process to the step C18 and repeats the series of processes. At the same time, if the monitoring timing comes (the step C19: YES), the control unit 210 returns the process to the step C11, and repeats the series of processes, such as setting the pattern, starting the overlay, and detecting the pattern.

On the other hand, if the content reproduction ends (the step C18: YES), the control unit 210 ends the reproduction monitoring process. Incidentally, in the process in the step C10, if it is judged that the content to be reproduced is not the monitoring-target content (the step C10: NO), the process is moved to the step C18. Then, practically, the process associated with the pattern detection is not performed, but the content reproduction is ended, and the reproduction monitoring process is ended.

Back in FIG. 3, if the reproduction monitoring process and the content reproduction process end, the process is returned to the step A12. Then, if there is the effective schedule (e.g. in the case of the schedule SCJ1, when the reproduction of the content 001 ends, the content 002 becomes the effective schedule), the above-mentioned processes are repeated.

As explained above, according to the content display system 100 in the embodiment, by virtue of the display control process as well as the content reproduction process and the reproduction monitoring process performed during the display control process, it is monitored whether or not the content is displayed as scheduled, in parallel with the content reproduction.

At this time, the pattern used in the monitoring is an extremely simple white or black rectangular binary pattern, and its detection accuracy hardly depends on hardware conditions, such as resolution and aspect ratio of the PDP 300. Moreover, for the same reasons, the detection device 400 does not require a complicated structure and configuration, which does not introduce complexity into the system configuration. Moreover, since the pattern is laid over the content, the content may be secondarily processed only if the pattern detection is required, and the content itself is not changed. Thus, it is possible to easily use the content for the reproduction as it originally is. Namely, according to the embodiment, it can be efficiently and effectively monitored whether or not the content is displayed as scheduled.

First Modified Example

The aspect of displaying the pattern in order to monitor whether or not the content is displayed as scheduled, is not limited to the above-mentioned first embodiment, and it can adopt various aspects. Now, with reference to FIG. 9, the aspects of displaying the pattern will be explained. FIG. 9 are schematic diagrams showing various display aspects of the pattern in a modified example of the present invention. Incidentally, the same or repeated positions as those in FIG. 8 carry the same numerical references, and the explanation thereof will be omitted, as occasion demands.

Figure 9A:
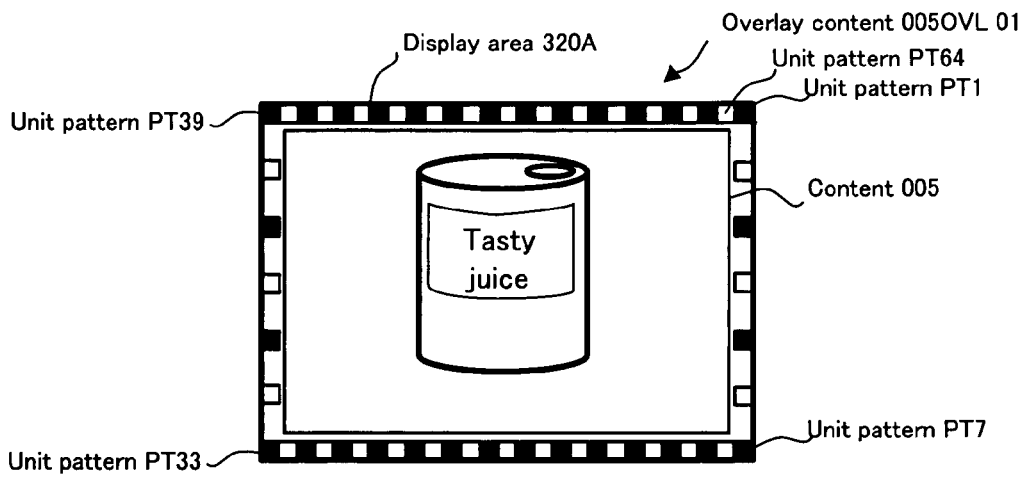
FIG. 9 are schematic diagrams showing various aspects of the pattern in a modified example of the present invention.
Figure 9B:
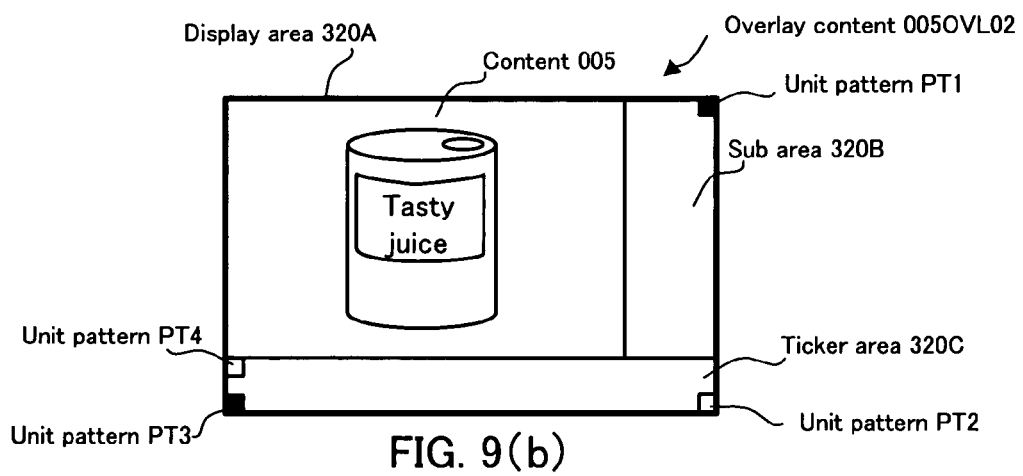
Figure 9C:
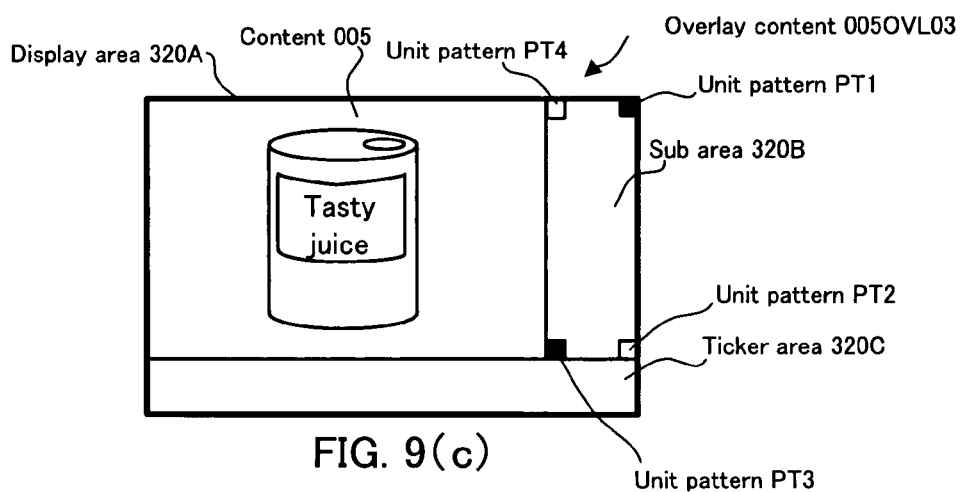

In FIG. 9, the overlay content may be overlay content 005OVL01, which is provided with 64 unit patterns from the unit patterns PT1 to PT64 as the pattern to be overlaid and in which each of the unit patterns is arranged to surround the outer circumference of the content (here, the content 005) (FIG. 9(a)). In this case, an information amount which can be displayed by the pattern as a whole is 64 bits, and it is possible to more finely judge whether or not the patterns match. Incidentally, in this case, as shown in FIG. 9(a), the display area of the content 005 may be set smaller than the display area 320A of the display screen unit 320.

On the other hand, the display area 320A may be divided into a sub area 320B to display therein, for example, information for complementing the content, and a ticker or telop area 320C to scroll-display text information, in addition to the display area of the content. In this case, the overlay content may be overlay content 005OVL02 in which the unit patterns PT1, PT2, PT3, and PT4 are properly arranged in the sub area 320B and the ticker area 320C, except the display area of the content (refer to FIG. 9(b)).

Incidentally, moreover, in this case, the overlay content may be overlay content 005OVL03 which is provided with a pattern including the four pattern units, as in the first embodiment, located on the four corners of the sub area 320B.

Second Modified Example

Figure 10:
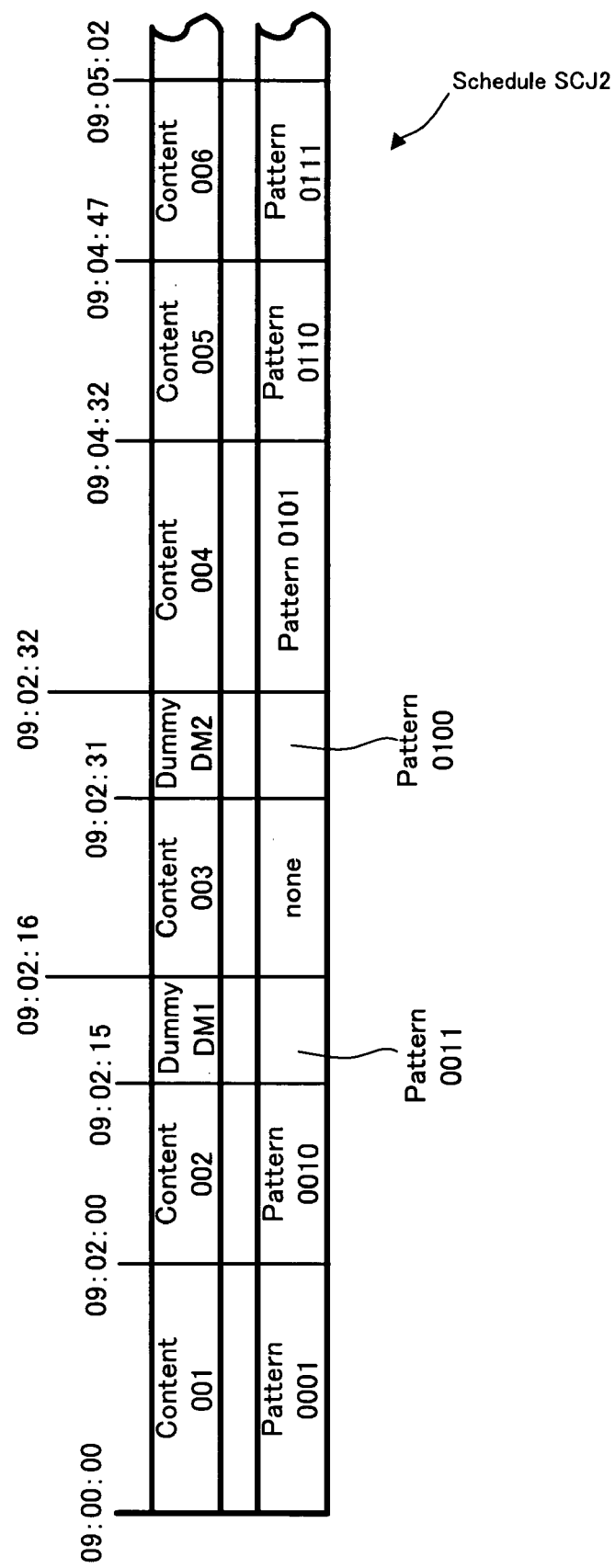
FIG. 10 is another schematic diagram showing the schedule associated with the content reproduction.

Moreover, the aspect of the schedule is not limited to the above-mentioned aspect. Now, with reference to FIG. 10, the details of the schedule in a second modified example of the present invention will be explained. FIG. 10 is a schematic diagram showing a schedule SCJ2 which represents one portion of the schedule analyzed in the content reproduction process. Incidentally, in FIG. 10, the same or repeated positions as those in FIG. 6 carry the same numerical references, and the explanation thereof will be omitted, as occasion demands.

In FIG. 10, the schedule SCJ2 is equal to the schedule SCJ1 in the first embodiment, in the point that the patterns are set to all the contents to be reproduced. However, the schedule SCJ2 is constructed differently from the schedule SCJ1 with regard to the aspect of setting the pattern display period.

Namely, a pattern corresponding to content 003 is not overlaid during the display period of the content 003, but is a pattern 0011 and a pattern 0100, which are displayed only 1 second before and after the display period of the content 003 (i.e. a period corresponding to "09:02:15" to "09:02:16" illustrated, and a period corresponding to "09:02:31" to "09:02:32" illustrated). At this time, the contents laid over these patterns are dummy contents of dummy DM1 and dummy DM2. Each of the dummy contents has no practical meaning, and it is, for example, a single-colored video image, which is merely used for the pattern detection.

As described above, even if the pattern is not displayed during the display period of the corresponding content, it is possible to set the pattern display period in association with the display period of the corresponding content (in this case, to set it before and after the display period). Even in this case, if each of the patterns detected at appropriate time points matches the pattern 0011 and the pattern 0100, that can facilitate the judgment that the content 003 whose display period is between the display periods of the pattern 0011 and the pattern 0100 is accurately displayed. Such schedule configuration is remarkably effective, for example, if the secondary process is not allowed to perform on the content.

Second Embodiment

Figure 11:
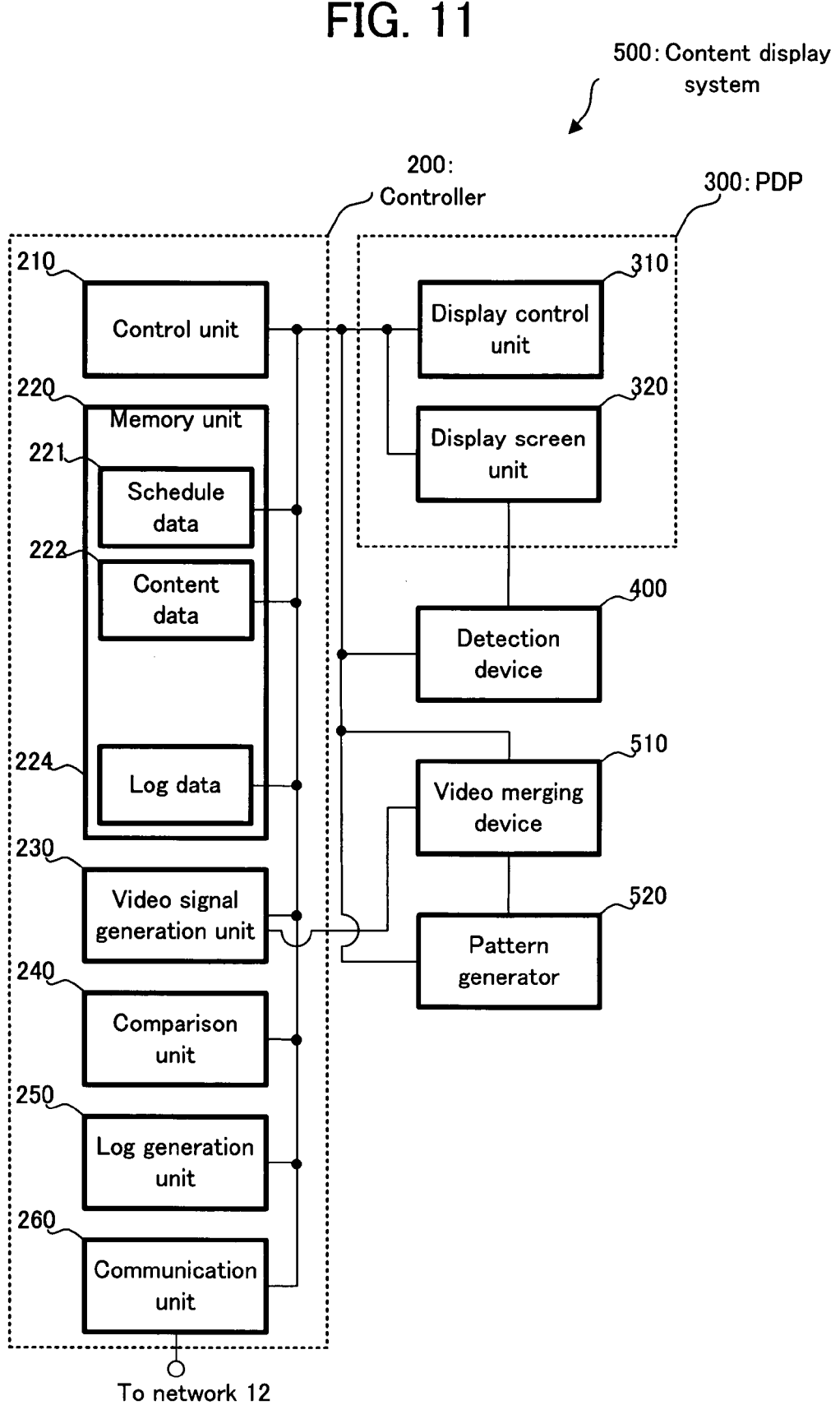
FIG. 11 is a block diagram showing a content display system in a second embodiment of the present invention.

Next, with reference to FIG. 11, a content display system in a second embodiment of the present invention will be explained. FIG. 11 is a block diagram showing a content display system 500. Incidentally, in FIG. 11, the same or repeated positions as those in FIG. 2 carry the same numerical references, and the explanation thereof will be omitted, as occasion demands.

In FIG. 11, the content display system 500 is different from the content display system 100 in the first embodiment, in the point that the memory unit 220 does not store therein the pattern data 223 and that a pattern generator 520 and a video merging device 510 are provided.

In the second embodiment, the pattern to be used for the monitoring of the content is supplied from the pattern generator 520. The pattern generator 520 is constructed to select one pattern from among a plurality of types of patterns set in advance (which have simple shapes as in the first embodiment) and supply it to the video merging device 510.

The video merging device 510 is electrically connected to the video signal generation unit 230, and if obtaining the video signal associated with the content to be reproduced from the video signal generation unit 230, the video merging device 510 generates a video signal so as to display the pattern obtained from the pattern generator 520 superimposed on the content, and supplies it to the display control unit 310. At this time, the pattern generator 520 is electrically connected to the control unit 210, and supplies the pattern generated in response to an instruction signal from the control unit 210, to the video merging device 510. Therefore, when the control unit 210 performs the same reproduction monitoring process as in the first embodiment, the instruction signal is supplied so as to merge the pattern to the content during the display period defined by the schedule, whereby the pattern is outputted form the pattern generator 520 to the video merging device 510 in synchronization with the content display period. As described above, even in the second embodiment, as in the first embodiment, it can be efficiently and effectively monitored whether or not the content is displayed as scheduled.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2006-122445 filed on Apr. 26, 2006 including the specification, claims, drawings and summary is incorporated herein by reference in its entirety.

What is claimed is:

1. A content display system comprising:
   a displaying device;
   a controlling device for controlling said displaying device to display, in accordance with a schedule in which at least content or contents to be displayed on said displaying device are specified with display period or periods of the content or contents to be displayed, the specified content or contents during the specified display period or periods, respectively;
   a pattern setting device for individually assigning video pattern or patterns in predetermined type or types to monitoring-target content or contents including at least one of the specified content or contents;
   a display period setting device for setting the display period or periods of the assigned video pattern or patterns in association with the display period or periods specified to the monitoring-target content or contents with the video pattern or patterns assigned, respectively; and
   a merging device for merging the assigned video pattern or patterns with the monitoring-target content or contents in at least one portion of the set display period or periods,
   said controlling device further controlling said displaying device to display the monitoring-target content or contents with the video pattern or patterns merged, if the video pattern or patterns are merged with the monitoring-target content or contents,
   said content display system further comprising:
   a detecting device for detecting the video pattern or patterns through display performed by said displaying device in such period or periods that the monitoring-target content or contents with the video pattern or patterns merged are displayed; and
   a judging device for judging whether or not the monitoring-target content or contents with the video pattern or patterns merged are displayed during the specified display period or periods on the basis of the detected video pattern or patterns.

2. The content display system according to claim 1, wherein
   in the schedule, the video pattern or patterns to be assigned to the monitoring-target content or contents are further specified with the display period or periods of the video pattern or patterns to be assigned,
   said pattern setting device assigns the specified video pattern or patterns to the monitoring-target content or contents in accordance with the schedule, and
   said display period setting device sets the display period or periods of the assigned video pattern or patterns as the display period or periods specified in accordance with the schedule.

3. The content display system according to claim 1, further comprising a first memory device for storing each of content data associated with the display of the content or contents and video pattern data associated with the display of the video pattern or patterns.

4. The content display system according to claim 3, further comprising a first obtaining device for obtaining the content data and the video pattern data from a predetermined server apparatus via a network.

5. The content display system according to claim 1, further comprising:
   a second obtaining device for obtaining schedule data for defining the schedule from a predetermined server apparatus via a network; and
   a schedule setting device for setting the schedule on the basis of the obtained schedule data.

6. The content display system according to claim 5, further comprising a second memory device for storing the obtained schedule data.

7. The content display system according to claim 1, wherein said judging device judges, if the detected video pattern or patterns match the video pattern or patterns assigned to the monitoring-target content or contents corresponding to time point or point in which the video pattern or patterns are detected, that the corresponding monitoring-target content or contents are displayed during the display period or periods.

8. The content display system according to claim 1, wherein
   each of the video pattern or patterns comprises at least one of unit patterns, which have geometric shapes with mutually different brightness, and at least one of which is set in a plurality of pattern set positions set in advance, and
   degree of brightness in each of the plurality of pattern set positions is detected during the period or periods that the monitoring-target content or contents with the video pattern or patterns merged are displayed.

9. The content display system according to claim 1, further comprising:
   a result information generating device for generating result information indicating a judgment result associated with said judging device; and
   a third memory device for storing the generated result information.

10. The content display system according to claim 1, wherein said merging device lays the assigned video pattern or patterns over the monitoring-target content or contents.

11. A content display method comprising:
   a first controlling process of controlling a displaying device to display, in accordance with a schedule in which at least content or contents to be displayed on said displaying device are specified with display period or periods of the content or contents to be displayed, the specified content or contents during the specified display period or periods, respectively;
   a pattern setting process of individually assigning pattern or patterns in predetermined type or types to monitoring-target content or contents including at least one of the specified content or contents;
   a display period setting process of setting the display period or periods of the assigned video pattern or patterns in association with the display period specified to the monitoring-target content or contents with the video pattern or patterns assigned, respectively;
   a merging process of merging the assigned video pattern or patterns with the monitoring-target content or contents in at least one portion of the set display period or periods;
   a second controlling process of controlling said displaying device to display the monitoring-target content or contents with the video pattern or patterns merged, if the video pattern or patterns are merged with the monitoring-target content or contents;
   a detecting process of detecting the video pattern or patterns through display performed by said displaying device in such period or periods that the monitoring-target content or contents with the video pattern or patterns merged are displayed; and
   a judging process of judging whether or not the monitoring-target content or contents with the video pattern or patterns merged are displayed during the specified display period or periods on the basis of the detected video pattern or patterns.

* * * * *